United States Patent [19]

Severance, Jr. et al.

[11] Patent Number: 5,017,752
[45] Date of Patent: May 21, 1991

[54] PLASMA ARC TORCH STARTING PROCESS HAVING SEPARATED GENERATED FLOWS OF NON-OXIDIZING AND OXIDIZING GAS

[75] Inventors: Wayne S. Severance, Jr.; Tommie Z. Turner, both of Florence, S.C.

[73] Assignee: ESAB Welding Products, Inc., Florence, S.C.

[21] Appl. No.: 487,747

[22] Filed: Mar. 2, 1990

[51] Int. Cl.5 .............................................. B23K 9/00
[52] U.S. Cl. ........................... 219/121.59; 219/121.54; 219/121.55; 219/121.44
[58] Field of Search ..................... 219/121.54, 121.55, 219/121.57, 75, 121.59, 121.39, 121.48, 121.51, 121.5, 121.44; 313/231.37, 321.41, 231.51

[56] References Cited

U.S. PATENT DOCUMENTS

| | | | |
|---|---|---|---|
| 3,373,306 | 3/1968 | Karlovitz | 313/231 |
| 3,403,211 | 9/1968 | Foex | 13/1 |
| 3,476,906 | 11/1969 | Rovan | 219/121 |
| 3,536,885 | 10/1970 | Mitchell | 219/121.54 |
| 3,541,297 | 11/1970 | Sunnen et al. | 219/121.36 |
| 3,588,594 | 6/1971 | Yamamoto et al. | 315/111 |
| 3,601,578 | 8/1971 | Gebel et al. | 219/75 |
| 3,644,782 | 2/1972 | Sheer et al. | 313/111 |
| 3,770,935 | 11/1973 | Tateno et al. | 219/75 |
| 3,949,188 | 4/1976 | Tateno | 219/121.51 |
| 3,988,566 | 10/1976 | Vogts et al. | 219/76 |
| 4,060,088 | 11/1977 | Morrison, Jr. et al. | 219/121 P |
| 4,341,941 | 7/1982 | Tateno | 219/121.55 |
| 4,410,788 | 10/1983 | Summers et al. | 219/121.55 |

FOREIGN PATENT DOCUMENTS 0068270  4/1982  Japan .............................. 219/121.55

Primary Examiner—M. H. Paschall
Attorney, Agent, or Firm—Bell, Seltzer, Park & Gibson

[57] ABSTRACT

A process for starting a plasma arc torch is disclosed which minimizes the oxidation of the electrode to thereby extend the life of the electrode. A flow of non-oxidizing gas is first generated between the discharge end of the torch electrode and the nozzle assembly of the torch. A pilot arc then is created between the discharge end of the electrode and the nozzle assembly. The pilot arc is transferred and the flow of non-oxidizing gas is terminated. A flow of oxidizing gas then is generated for plasma formation.

6 Claims, 2 Drawing Sheets

PLASMA ARC TORCH STARTING PROCESS HAVING SEPARATED GENERATED FLOWS OF NON-OXIDIZING AND OXIDIZING GAS

FIELD OF THE INVENTION

This invention relates to a process for starting a plasma arc torch and more particularly to a process for starting a plasma arc torch of the type having a metallic electrode and nozzle assembly positioned adjacent the discharge end of the electrode.

BACKGROUND OF THE INVENTION

Plasma arc torches generally include a metallic electrode and a nozzle assembly positioned adjacent the discharge end of the electrode. These torches typically operate in a transferred arc mode where the arc extends from the discharge end of the electrode through the nozzle to a workpiece. An oxidizing gas normally is used in the torch for plasma generation and for facilitating faster and more efficient cutting of the workpiece.

However, because of the high voltages required for starting and transferring the arc from the electrode to the workpiece, some prior art torches typically are started with a non-oxidizing gas by creating a pilot arc between the discharge end of the electrode and the nozzle assembly. If an oxidizing gas were used during the starting process, the high voltages used would create severe oxidation conditions and reduce the effective electrode life. This generated arc then is transferred to the workpiece When the arc is transferred, the flow of non-oxidizing gas is reduced and an oxidizing gas such as oxygen is added to the flow of the non-oxidizing gas.

Generally, the aforementioned prior art method requires careful control and timing of the gas flow and in some torches requires a special torch structure. For example, in one torch design, argon flows through multiple annular gas ports positioned between two nozzle members during initial arc starting. When the arc has transferred, some argon flow in the gas ports is terminated and substituted with a flow of oxidizing gas so that during the transferred torch operation, a reduced flow of argon is mixed with an oxidizing gas. This use of a combination of argon and oxygen or air within the torch requires simultaneous, complex control over two different gas flows for maintaining proper mixing and operation of the torch. Additionally, a non-oxidizing gas such as argon results in the increased formation of dross when the non-oxidizing gas is mixed with oxygen or air in a transferred plasma arc torch operation during a cutting operation.

It is therefore an object of the present invention to provide a process for starting a plasma arc torch of the described type which minimizes the oxidization of an electrode by providing a flow of non-oxidizing gas during pilot arc creation and a new, substituted flow of oxidizing gas only during transferred plasma arc torch operation.

SUMMARY OF THE INVENTION

These and other objects and advantages of the present invention are achieved by the starting process for the plasma arc torch of the type having a metallic electrode and nozzle assembly positioned adjacent a discharge end of the electrode wherein the process minimizes the oxidation of the electrode and thereby extends the life of the electrode.

A flow of non-oxidizing gas is first generated between the discharge end of the electrode and the nozzle assembly. Then, a pilot arc is created between the discharge end of the electrode and the nozzle assembly. The pilot arc is transferred so as to create a transferred arc extending from the discharge end of the electrode to a workpiece positioned on the side of the nozzle assembly opposite the electrode. The flow of non-oxidizing gas is concurrently terminated and a flow of oxidizing gas is generated between the discharge end of the electrode and the nozzle assembly such that the transferred arc and the oxidizing gas create a plasma gas flow between the discharge end of the electrode and the workpiece. In the preferred embodiment, the non-oxidizing gas consists essentially of nitrogen and the oxidized gas consists essentially of oxygen.

After cutting is complete, the transferred arc is terminated concurrently with the flow of oxidizing gas. Additionally, a flow of non-oxidizing gas is generated between the discharge end of the electrode and the nozzle assembly.

BRIEF DESCRIPTION OF THE DRAWINGS

Some of the objects and advantages of the present invention having been stated, others will appear as the description proceeds, when taken in conjunction with the accompanying drawing in which.

DETAILED DESCRIPTION OF THE PREFERRED EMBODIMENTS

Figure 1:
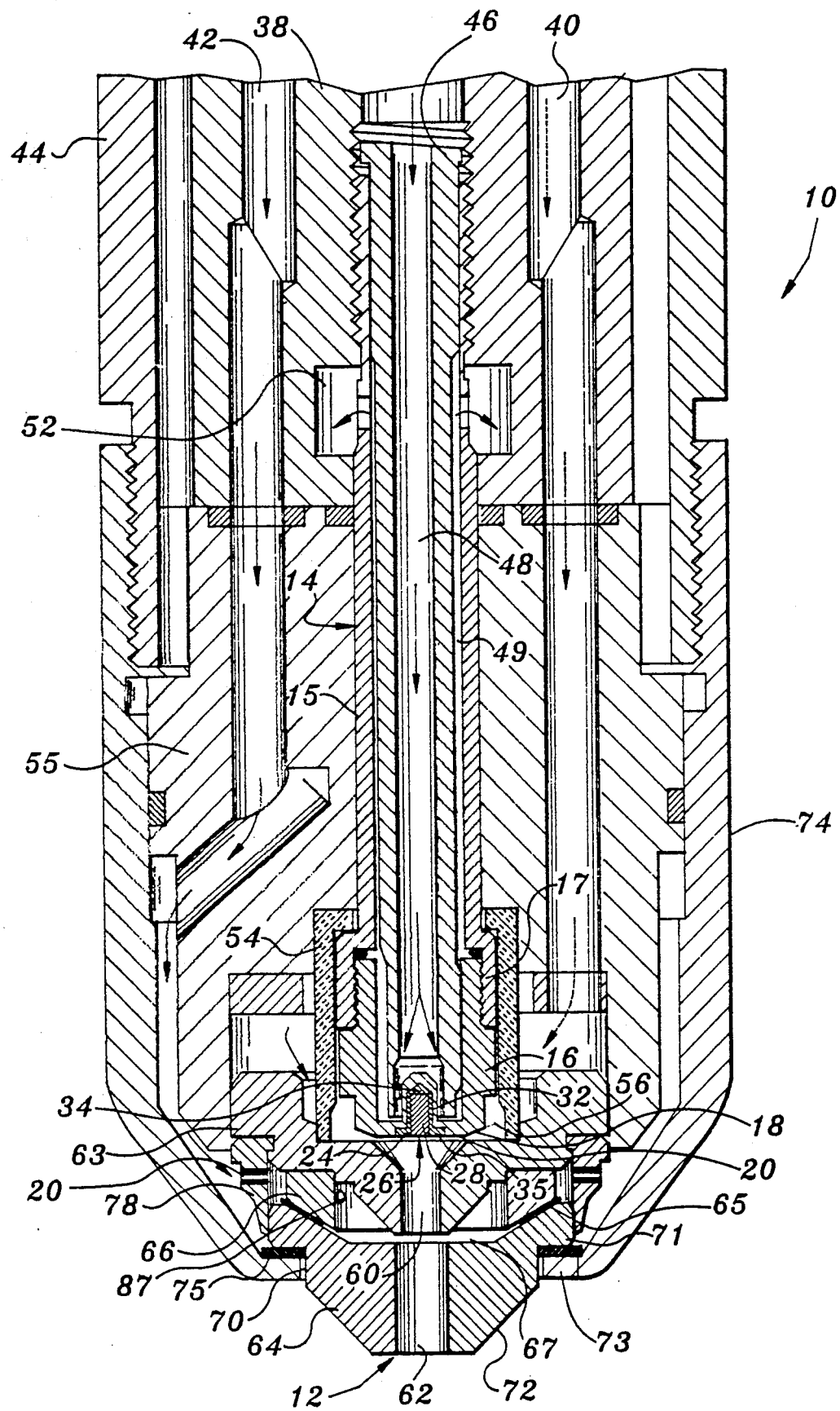
FIG. 1 is a sectioned side elevational view of a plasma arc torch which can be used in accordance with the process of the invention.

Referring now to the drawings, and more particularly to FIG. 1, there is illustrated one type of plasma arc torch which can be used with the starting process in accordance with the present invention. The plasma arc torch 10 includes a nozzle assembly 12 and a tubular electrode 14. The electrode 14 is preferably made of copper or a copper alloy, and it is composed of an upper tubular member 15 and a lower, cup-shaped member or holder 16. More particularly, the upper tubular member 15 is of elongate open tubular construction and it defines the longitudinal axis of the torch. The member 15 also includes an internally threaded lower end portion 17. The holder 16 is also of tubular construction, and it includes a lower front end and an upper rear end. A transverse end wall 18 closes the front end of the holder 16, and the transverse end wall 18 defines an outer front face 20. The rear end of the holder is externally threaded and is threadedly joined to the lower end portion 17 of the upper tubular member.

A cavity 24 is formed in the front face 20 of the end wall 18 and extends rearwardly along the longitudinal axis. An insert assembly 26 is mounted in the cavity and comprises a generally cylindrical emissive insert 28 which is disposed coaxially along the longitudinal axis. The emissive insert 28 is composed of a metallic material which has a relatively low work function so that it is adapted to readily emit electrons upon an electrical potential being applied thereto. Suitable examples of such materials are hafnium, zirconium, tungsten, and alloys thereof.

A relatively non-emissive sleeve 32 is positioned in the cavity 24 coaxially about the emissive insert 28 with the sleeve 32 having a peripheral wall and a closed bottom wall 34 which are metallurgically bonded to the walls of the cavity. Further, the sleeve 32 includes an annular flange 35 and so as to define an outer annular surface which lies in the plane of the front face 20 of the holder. Further description of sleeve 32 may be obtained from copending application Ser. No. 07/466,205, filed Jan. 17, 1990, pending.

In the illustrated embodiment, the electrode 14 is mounted in a plasma arc torch body 38, which has gas and liquid passageways 40 and 42 respectively. The torch body 38 is surrounded by an outer insulated housing member 44.

A tube 46 is suspended within the central bore 48 of the electrode 14 for circulating a liquid medium such as water through the electrode structure 14. The tube 46 is of a diameter smaller than the diameter of the bore 48 so as to provide a space 49 for the water to flow upon discharge from the tube 46. The water flows from a source (not shown) through the tube 46 and back through the space 49 to the opening 52 in the torch body 38 and to a drain hose (not shown).

The passageway 42 directs the injection water into the nozzle assembly 12 where it is converted into a swirling vortex for surrounding the plasma arc. The gas passageway 40 receives gas from a suitable source (not shown) which in accordance with the present invention includes a source of non-oxidizing gas, preferably nitrogen, and an oxidizing gas, preferably oxygen. Air also can be used. Means (not shown) controls the respective flows of non-oxidizing and oxidizing gases into the passageway which directs the gas through a conventional gas baffle 54 of any suitable high temperature ceramic material into a gas plenum chamber 56 in a swirling fashion as is well-known. The gas flows out from the plenum chamber 56 through the arc constricting coaxial bores 60 and 62 of the nozzle assembly 12. The electrode 14 holds in place the ceramic gas baffle 54 and a high temperature plastic insulating member 55. The member 55 electrically insulates the nozzle assembly 12 from the electrode 14.

The nozzle assembly 12 comprises an upper nozzle member 63 and a lower nozzle member 64, with the members 63 and 64 including the first and second bores 60 and 62 respectively. Although the upper and lower nozzle members may both be metal, a ceramic material such as alumina is preferred for the lower nozzle member. The lower nozzle member 64 is separated from the upper nozzle member 63 by a plastic spacer element 65 and a water swirl ring 66. The space provided between the upper nozzle member 63 and the lower nozzle member 64 forms a water chamber 67. The bore 60 of the upper nozzle member 63 is in axial alignment with the longitudinal axis of the torch electrode 14. Also, the bore 60 is cylindrical, and it has a chamfered upper end adjacent the plenum chamber 56, with a chamfer angle of about 45°.

The lower nozzle member 64 comprises a cylindrical body portion 70 which defines a forward (or lower) end portion and a rearward (or upper) end portion, and with the bore 62 extending coaxially through the body portion. An annular mounting flange 71 is positioned on the rearward end portion, and a frusto-conical surface 72 is formed on the exterior of the forward end portion so as to be coaxial with the second bore 62. The annular flange 71 is supported from below by an inwardly directed flange 73 at the lower end of the cup 74, with the cup 74 being detachably mounted by interconnecting threads to the outer housing member 44. Also, a gasket 75 is disposed between the two flanges 71 and 73.

The arc constricting bore 62 in the lower nozzle member 64 is cylindrical, and it is maintained in axial alignment with the arc constricting bore 60 in the upper member 63 by a centering sleeve 78 of any suitable plastic material. The centering sleeve 78 has a lip at the upper end thereof which is detachably locked into an annular notch in the upper nozzle member 63. The centering sleeve 78 extends from the upper nozzle in biased engagement against the lower member 64. The swirl ring 66 and spacer element 65 are assembled prior to insertion of the lower member 64 into the sleeve 78. The water flows from the passageway 42 through openings 85 in the sleeve 78 to the injection ports 87 of the swirl ring 66, and which inject the water into the water chamber 67. The injection ports 87 are tangentially disposed around the swirl ring 66, to cause the water to form a vortical pattern in the water chamber 67. The water exits the water chamber 67 through the arc constricting bore 62 in the lower nozzle member 64.

Figure 3:
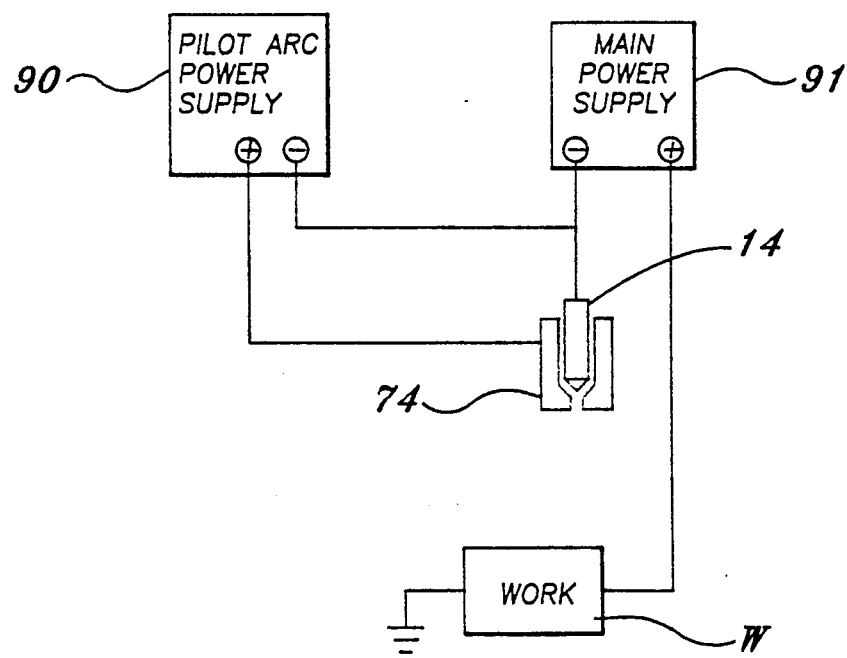
FIG. 3 is a highly schematic diagram showing the basic components and their electrical interrelationship for operation of a plasma arc torch in accordance with the process of the present invention.

As shown schematically in FIG. 3, a pilot arc power supply 90 is connected to the electrode 14 and torch body in a series circuit relationship. Switch means (not shown) which may be in the form of a toggle switch positioned on the torch at a convenient location suitable for an operator's use, can control the initial pilot arc. A main power supply 91 is connected to the torch electrode 14 in a series circuit relationship with a metal workpiece which is typically grounded.

METHOD OF OPERATION

Figure 2:
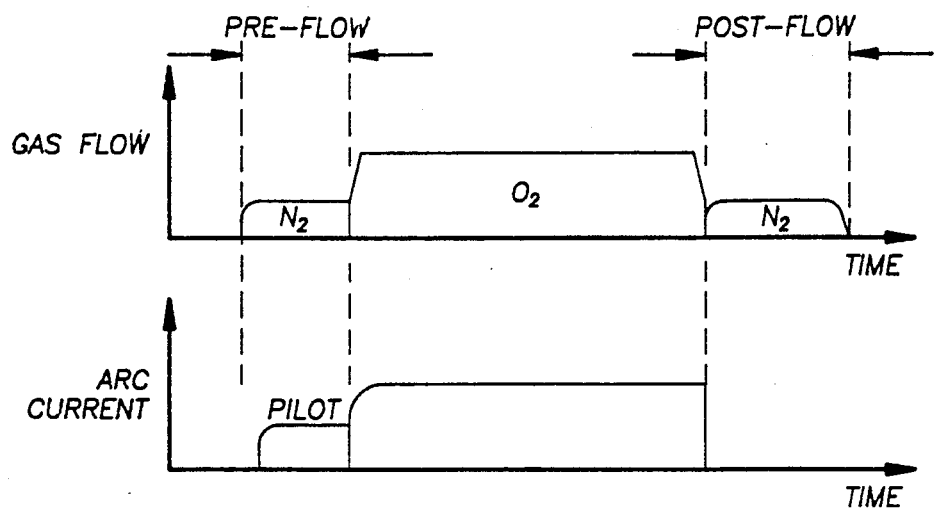
FIG. 2 shows two graphs comparing both gas flow and time, and arc current and time during operation of a plasma arc torch in accordance with the process of the present invention.

To start the plasma arc torch as described in accordance with the process of the present invention, a flow of non-oxidizing gas, preferably nitrogen, is generated to flow into the gas passageway 40, this flow is directed through the conventional gas baffle 54. The gas enters the plenum chamber 56 in a swirling fashion and flows outwardly therefrom through the arc constricting coaxial bores 60, 62 of the nozzle assembly 12. A pilot arc then is momentarily created between the discharge end of the electrode and the nozzle assembly 12 (FIG. 2). The pilot arc is transferred to the workpiece through the arc constricting bores 60 and 62 respectively. While the pilot arc is transferred, the flow of non-oxidizing gas is substantially concurrently terminated. A new flow of oxidizing gas is directed into the passageway 40 and through the gas baffle, into the gas plenum chamber 56, and through the arc constricting coaxial bores 60, 62 of the nozzle assembly 12. The transferred arc and the oxidizing gas create a plasma gas flow between the electrode, through the nozzle assembly 12, and to the workpiece W. Each arc constricting bores 60 and 62 contributes to the intensification and collimation of the arc. Water discharged into the passageway 42 directs the injection of water into the nozzle assembly 12 where it is converted into a swirling vortex for surrounding the plasma arc.

To terminate operation of the torch, the transferred arc is terminated while substantially concurrently terminating the flow of the oxidizing gas. At the same time, a flow of non-oxidizing gas is generated between the discharge of the electrode and the nozzle assembly by directing the non-oxidizing gas, preferably nitrogen, into the passageway 40, and ultimately through the coaxial bore 60 and 62 of the nozzle assembly 12.

The starting process of the present invention offers several advantages. Starting the torch in a non-oxidizing gas eliminates the problem of oxygen fires starting in the torch such as by arcing between torch parts. In the event that a fire does occur, the post-flow of non-oxidizing gas can serve to extinguish the fire. In the many torch designs which use a copper nozzle, oxidation and erosion of the copper nozzle also is greatly reduced. Oxidation of the nozzle affects both starting and cut quality. Oxidation of any copper portions of the electrode also are greatly reduced. The process in accordance with the present invention permits a greater number of starts because the electrode and nozzle longevity are extended.

In the drawings and specification, there has been set forth a preferred embodiment of the invention, and although specific terms are employed, they are used in a generic and descriptive sense only and not for purposes of limitation.

That which is claimed is:

1. A process of starting a plasma arc torch of the type comprising a metallic electrode and an electrically conductive nozzle assembly positioned adjacent a discharge end of the electrode, and which minimizes the oxidation of the electrode and thereby extends the life of the electrode, said process comprising the steps of generating a flow consisting essentially of a non-oxidizing gas between the discharge end of the electrode and said nozzle assembly, then creating a pilot arc between the discharge end of said electrode and said nozzle assembly, then transferring the pilot arc so as to create a transferred arc which extends from the discharge end of the electrode to a workpiece positioned on the side of the nozzle assembly opposite the electrode, and while completely terminating the flow of the non-oxidizing gas and generating a flow of an oxidizing gas between the discharge end of the electrode and the nozzle assembly and such that the transferred arc and the oxidizing gas create a plasma gas flow between the discharge end of the electrode and the workpiece.

2. The starting process as defined in claim 1 comprising the further subsequent steps of terminating the transferred arc, and substantially concurrently terminating the flow of the oxidizing gas, and substantially concurrently generating a flow of the non-oxidizing gas between the discharge end of the electrode and the nozzle assembly.

3. The starting process as defined in claim 2 wherein said non-oxidizing gas consists essentially of nitrogen and said oxidizing gas consists essentially of oxygen.

4. The starting process as defined in claim 3 wherein said nozzle assembly comprises an upper nozzle member mounted adjacent said discharge end of said electrode, and a lower nozzle member mounted adjacent said upper nozzle member on the side thereof opposite said electrode, and with said upper and lower nozzle members having respective aligned bores for the passage of the plasma gas flow, and comprising the further step of introducing a flow of a liquid between the upper and lower nozzle members substantially concurrently with the step of transferring the pilot arc, and so as to envelope the plasma gas flow with the liquid.

5. The starting process as defined in claim 4 wherein the liquid is water.

6. The starting process as defined in claim 5 wherein the electrode includes a generally cylindrical emissive insert positioned at the discharge end of the electrode.

* * * * *